US007487915B2

(12) United States Patent
Alasia et al.

(10) Patent No.: US 7,487,915 B2
(45) Date of Patent: Feb. 10, 2009

(54) REFLECTIVE DECODERS FOR USE IN DECODING OPTICALLY ENCODED IMAGES

(75) Inventors: Alfred V. Alasia, Lake Worth, FL (US); Alfred J. Alasia, Royal Palm Beach, FL (US); Thomas C. Alasia, Lake Worth, FL (US); Slobodan Cvetkovic, Lake Worth, FL (US)

(73) Assignee: Graphic Security Systems Corporation, Lake Worth, FL (US)

( * ) Notice: Subject to any disclaimer, the term of this patent is extended or adjusted under 35 U.S.C. 154(b) by 55 days.

(21) Appl. No.: 11/510,223

(22) Filed: Aug. 25, 2006

(65) Prior Publication Data

US 2007/0057061 A1 Mar. 15, 2007

(51) Int. Cl.
*G06K 7/14* (2006.01)
(52) U.S. Cl. .................................. 235/454; 235/439
(58) Field of Classification Search ................ 235/435, 235/439, 454, 468; 380/54, 57; 356/71; 382/199; 359/619–622, 627
See application file for complete search history.

(56) References Cited

U.S. PATENT DOCUMENTS

| 4,645,301 | A | * | 2/1987 | Orensteen et al. ............. 380/54 |
| 6,496,287 | B1 | | 12/2002 | Seiberle et al. |
| 2002/0054680 | A1 | * | 5/2002 | Huang et al. ................... 380/54 |
| 2003/0179364 | A1 | * | 9/2003 | Steenblik et al. .............. 356/71 |
| 2005/0053234 | A1 | | 3/2005 | Alasia et al. |
| 2005/0063067 | A1 | * | 3/2005 | Phillips et al. ............... 359/614 |
| 2005/0089163 | A1 | * | 4/2005 | Luthi ........................... 380/54 |
| 2007/0110317 | A1 | * | 5/2007 | Davis et al. .................. 382/199 |

OTHER PUBLICATIONS

International Search Report, PCT Application No. PCT/US2006/034701, dated Oct. 3, 2007, 2 pages.

* cited by examiner

*Primary Examiner*—Daniel St.Cyr
(74) *Attorney, Agent, or Firm*—Hunton & Williams, LLP

(57) ABSTRACT

A reflective decoding device is provided for use in decoding an encoded image comprising a latent image encoded using at least one encoding parameter. The device comprises a substrate with a reflective surface portion having a surface topography comprising a predetermined pattern of topographical features. The predetermined pattern is configured with at least one geometric characteristic corresponding to the at least one encoding parameter so that placement of a light-transmissive sheet having the encoded image formed thereon over the predetermined pattern of topographical features allows the latent image to be viewed.

28 Claims, 9 Drawing Sheets

REFLECTIVE DECODERS FOR USE IN DECODING OPTICALLY ENCODED IMAGES

BACKGROUND OF THE INVENTION

To prevent unauthorized duplication or alteration of documents, special indicia or background patterns may be provided for sheet materials such as tickets, checks, currency, and the like. The indicia or background pattern is imposed upon the sheet material usually by some type of printing process such as offset printing, lithography, letterpress or other like mechanical systems, by a variety of photographic methods, by xeroprinting, and a host of other methods. The pattern or indicia may be produced with ordinary inks, from special inks which may be magnetic, fluorescent, or the like, from powders which may be baked on, from light sensitive materials such as silver salts or azo dyes, and the like, and from materials that are difficult (e.g., clear varnish) or impossible (e.g., IR and UV emitting materials) to view in the visible light spectrum. Most of these patterns placed on sheet materials depend upon complexity and resolution to avoid ready duplication. Consequently, they add an increment of cost to the sheet material without being fully effective in many instances in providing the desired protection from unauthorized duplication or alteration.

Similar patterns or indicia may be printed on product packaging or directly on products or materials subject to counterfeiting.

Various methods of counterfeit-deterrent strategies have been suggested including Moire-inducing line structures, variable-sized dot patterns, latent images, see-throughs, barcodes, and diffraction based holograms. None of these methods has proven to be satisfactory.

More successful are methods that involve the use of optically encoded images such as those described in U.S. Pat. Nos. 3,937,565 and 5,708,717 and in U.S. patent application Ser. No. 09/267,420 filed Mar. 11, 1999; U.S. patent application Ser. No. 10/847,943 filed May 18, 2004; U.S. patent application Ser. No. 10/847,962 filed May 18, 2004; U.S. patent application Ser. No. 10/810,000 filed Mar. 26, 2004; and U.S. patent application Ser. No. 11/068,350 filed Feb. 28, 2005, all of which are incorporated herein by reference in their entirety. Optically encoded images typically cannot be discerned or interpreted without a specially tailored optical decoder. They may be used on virtually any form of printed document including legal documents, identification cards and papers, labels, packaging, currency, stamps, etc. The value of using non-reproducible encoded images on documents such as drivers' licenses and vehicle titles is readily apparent. Such images are also highly valuable in their use on packaging as a means of identifying counterfeit goods.

Optically encoded images are typically encoded by one of several methods that involve imposing a regularized periodic pattern on the image or on a background image or pattern. The periodic pattern has a particular predetermined frequency (or frequencies, if multi-dimensional). This may be accomplished through the use of a specialized camera, as described in U.S. Pat. No. 3,937,565, or digitally, as described in U.S. Pat. No. 5,708,717 and the U.S. patent applications referred to above. The image to be encoded can be incorporated into the background pattern or image by introducing distortions to the regular periodic pattern. The high frequency of the regular pattern renders the encoded image difficult or impossible to discern with the naked eye. The image can be readily viewed through the placement of a specially configured refractive decoder lens over the image or, as described in U.S. patent application Ser. No. 11/068,350, through the use of software-based decoding algorithms.

The refractive decoder lenses used to decode encoded images have lenticules or micro-lens elements regularly spaced at a frequency (or frequencies) corresponding to the encoding frequency allows the distortions to be assembled to form the original image. When placed over the encoded image, these lenses allow a viewer to see samples of the image taken at intervals determined by the frequency of the lenticular lens. The lens magnifies these samples and human vision interpolates them into a continuous picture. When oriented at the proper angle, this causes deviations from primary image characteristics having the same frequency to be sampled and magnified, thus standing out from the primary image or background. The action of the lens is essentially to assemble periodic samples of the encoded image into a reconstruction of the original image that was encoded and embedded in the primary image or background.

The typical refractive decoder lens is formed as a transparent or translucent planar element with lens elements (e.g., lenticules or microlenses) formed on one side. The decoder lens must have sufficient thickness to support lens elements with a particular configuration and focal length. Such lenses are typically made from clear plastic and are generally somewhat rigid in order to maintain the relative spacing of the lens elements.

It can be seen from the above that the typical approach to authentication using encoded images is to encode an authentication image and print the encoded image on a document, label or other object to be authenticated. To authenticate the object, the encoded images is positioned for viewing and a refractive decoder lens of the proper frequency is placed over the encoded image in the proper orientation so that the encoded image may be viewed through the lens. The decoded image is then compared to the expected authentication image.

The present invention provides an alternative to the authentication methodology described above and an alternative to the use of refractive lens decoders to decode the encoded images. In the methods of the present invention, the encoded image is printed on a light transmittent (i.e., transparent or translucent) sheet rather than on an opaque surface. The image is decoded by placing the sheet over a reflective decoder surface that has been embossed with a regularized pattern of reflective elements having a frequency (or frequencies) corresponding to the frequency (or frequencies) with which the image was encoded. The embossed pattern may be, for example, a pattern of alternating linear ridges and valleys. The elements may be formed with a particular cross-sectional shape so that light reflected from the embossed pattern is focused in a series of linear samples. The effect is similar to the manner in which a lenticular lens "samples" an image over which it is placed. When the transmittent sheet is placed over the embossed reflective decoder surface in the proper orientation, the light passing through the transmittent sheet is reflected back in a pattern corresponding to the frequency of the embossed pattern. This causes the deviations in the encoded image to stand out from the primary image or background printed on the transmittent sheet. A similar effect analogous to a microarray lens decoder can be achieved through the embossing of a matrix of circular depressions into the reflective surface.

SUMMARY OF THE INVENTION

An illustrative aspect of the invention provides a reflective decoding device for use in decoding an encoded image comprising a latent image encoded using at least one encoding parameter. The device comprises a substrate with a reflective surface portion having a surface topography comprising a predetermined pattern of topographical features. The predetermined pattern is configured with at least one geometric characteristic corresponding to the at least one encoding parameter so that placement of a light-transmissive sheet having the encoded image formed thereon over the predetermined pattern of topographical features allows the latent image to be viewed.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

The present invention provides authentication methods that make use of analog or digitally produced encoded images. Encoded images are typically embedded in a background or source image and printed on items that may be subject to alteration, falsification or counterfeiting. As used herein, the term "encoded image" refers to an image that is manipulated and/or hidden within a background field or within another image in such a way that when applied or printed, the encoded image cannot be discerned by the human eye without the use of a decoding device. Some encoded images are hidden so that their presence is difficult to discern from a background or primary image. Other encoded images are easily visible but not readable because the image content has been systematically scrambled or otherwise manipulated.

Encoded images of particular significance to the present invention are those that are configured to be optically decoded using a lenticular (or micro-array) lens. Such images take advantage of the ability of the lenticular lens to screen image content based on the lenticule frequency of the lens. These images are typically encoded by one of several methods that involve establishing a regularized periodic pattern having a frequency corresponding to that of the lenticular lens to be used as a decoder, then introducing distortions of the pattern that render the image difficult to discern with the naked eye.

Figure 1:
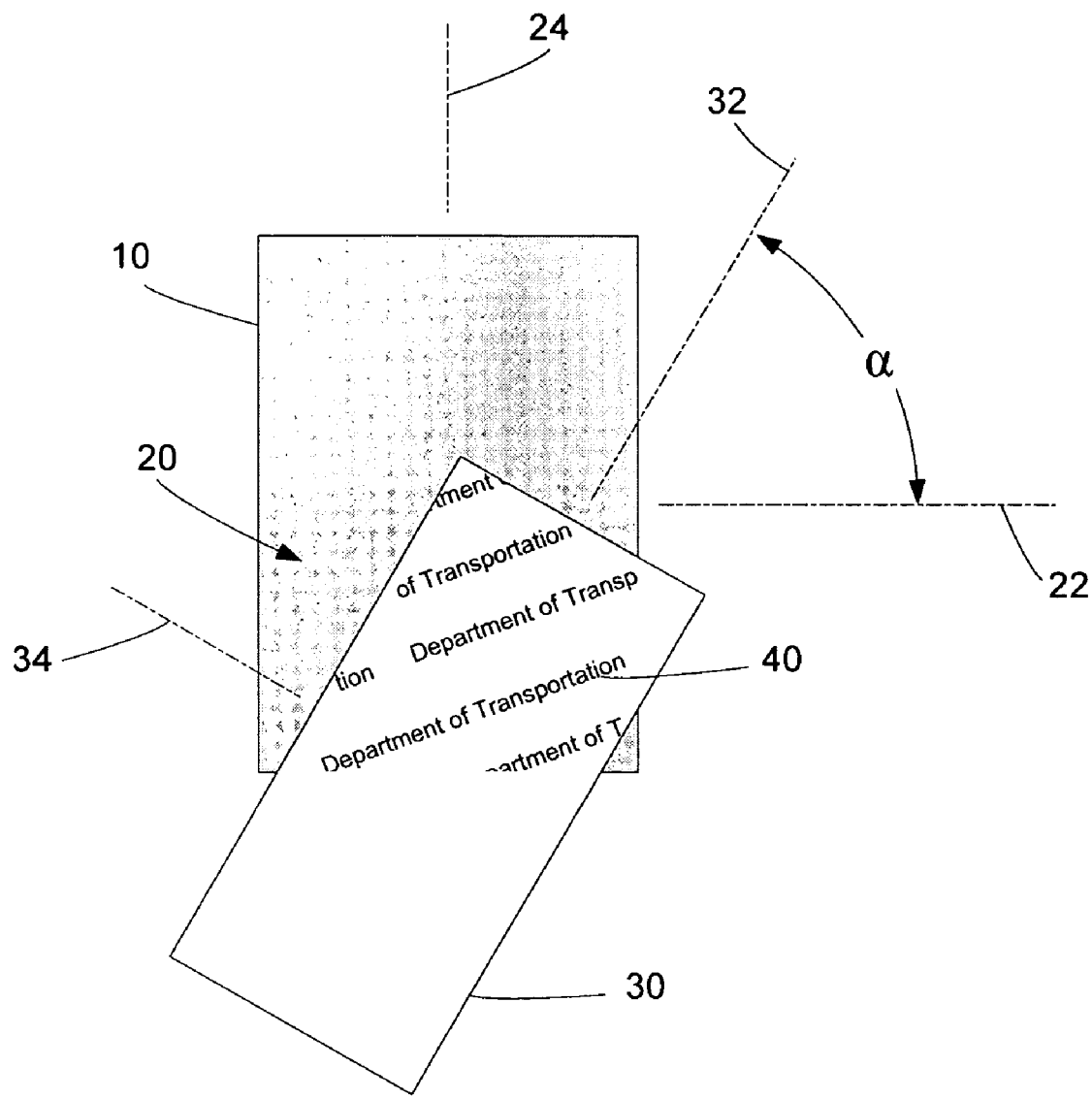
FIG. 1 is an illustration of the use of an refractive decoder to decode a printed encoded image.

Digitally encoded images can be embedded into a background or into other images so that the mere presence of the encoded image is difficult to discern. With reference to FIG. 1, an encoded image 10 may be established using a primary or source image 20 and a secondary image 40 which is embedded into the primary image 20 in such a way that the secondary image 40 can only be viewed with a decoding device 30 of a predetermined frequency. The primary image may be a blank gray or colored background image as in the encoded image 10 of FIG. 1 or may include visible image content such as a design or photograph or any other form of indicia. The secondary image may also be any form of image or indicia and may include indicia related in some way to the primary image. In the example encoded image 10, the secondary image 40 is a repeating pattern based on the words "Department of Transportation." The secondary image can be separately encoded then merged or embedded into the primary image or the process of embedding may be accomplished in such a way that the secondary image is encoded as it is embedded. As shown in FIG. 1, the secondary image may be viewed by placing the decoding device 30 over the encoded image 10 at the correct orientation. In the example of FIG. 1, the decoding device has a horizontal axis 32 and a vertical axis 34 and the encoded image 10 has a horizontal axis 22 and a vertical axis 24. The secondary image 40 is revealed when the horizontal axis 32 of the decoding device 30 is oriented at the decoding angle $\alpha$ with respect to the horizontal axis 22 of the encoded image 10. The decoding angle $\alpha$ is an encoding parameter that is established prior to encoding and embedding the secondary image.

The methods by which the secondary image is embedded or merged with the primary image can be divided into two general approaches. In the first approach, a regularized periodic behavior is imposed on the primary image using a predetermined frequency. This is primarily accomplished by rasterizing the primary image at the predetermined frequency. The secondary image is then mapped to the primary image so that the regularized behavior of the primary image can be altered at locations corresponding to those in the secondary image that include image content. The alterations are small enough that they are difficult for the human eye to discern. However, when a lenticular lens having a frequency corresponding to the predetermined frequency is placed over the primary image, it will screen the primary image content in such a way that the alterations are brought out to form the latent secondary image.

In the second approach, the regularized periodic behavior is first imposed on the secondary image rather than the primary image, with alterations in that behavior occurring wherever there is content in the secondary image. The secondary image is then mapped to the primary image and the content of the primary image altered pixel by pixel based on the content of the encoded secondary image.

The output of any of the above methods may be a printed encoded image (i.e., a combined primary and latent secondary image printed on a document or other item) or may be a digital encoded image that may be transmitted or stored for later application to an object.

The common thread of the various encoding methods and the resulting encoded images is that they involve deviations from regular periodic behavior (e.g., spatial location, tone density, raster angle). If the encoded image is applied to an opaque substrate, the deviations may be made apparent through the use of a lenticular decoding lens having a frequency corresponding to that of the regular behavior. The frequency of the behavior may be equal to the lens frequency or may be an even multiple of the lens frequency. The lenticular lens acts as a content screen that emphasizes the deviations from the regularized behavior and assembles them into the secondary image. It will be understood that the surface to which the encoded image is applied need not, itself, be opaque so long as there is a reflective substrate beneath that surface. For example, the encoded image may be printed on a cellophane wrapper applied to a package or to a light-transmitting outer layer of a laminate packaging material or to a transparent insert in a passport folder. Such encoded images may still be decoded using a lenticular lens because light will be reflected by the materials underneath the light transmitting materials to which the encoded images are applied.

A lenticular lens can be used to decode both visible encoded images whose content has been systematically scrambled and encoded images embedded into a primary image or background. For some applications, however, the use of a refractive decoder may be difficult or impractical. For example, there are many instances where there is a desire to include a decoder with each encoded image. As described in U.S. patent application Ser. No. 09/267,420, for example, it may be desirable to make certain official documents self-authenticating by making a decoder part of the document. Another example is in the packaging of goods subject to counterfeiting. While it is possible to use a separate decoder to authenticate each packaged product, it may be simpler to incorporate a self-authentication device on the package.

Refractive lens decoders may be used in such self-authentication applications. However, their use may be precluded by practical difficulties. Such difficulties may relate to the cost of producing the lenses or may relate to the materials and thicknesses required.

The present invention was developed as an alternative to the use of lens decoders in self authentication of encoded images to decode an encoded image approach to application and decoding of an encoded image. In the methods of the present invention, the refractive lens is replaced by a reflective surface at or beneath a surface on which an encoded image has been applied. The topography of the reflective surface is constructed so that light reflected from the reflective surface and through the encoded image produces a sampling effect similar to that of the refractive lens. By constructing the reflective surface topography so that one or more of its characteristics correspond to certain encoding parameters, the light reflected through the encoded image allows the embedded image to be viewed.

Figure 2:
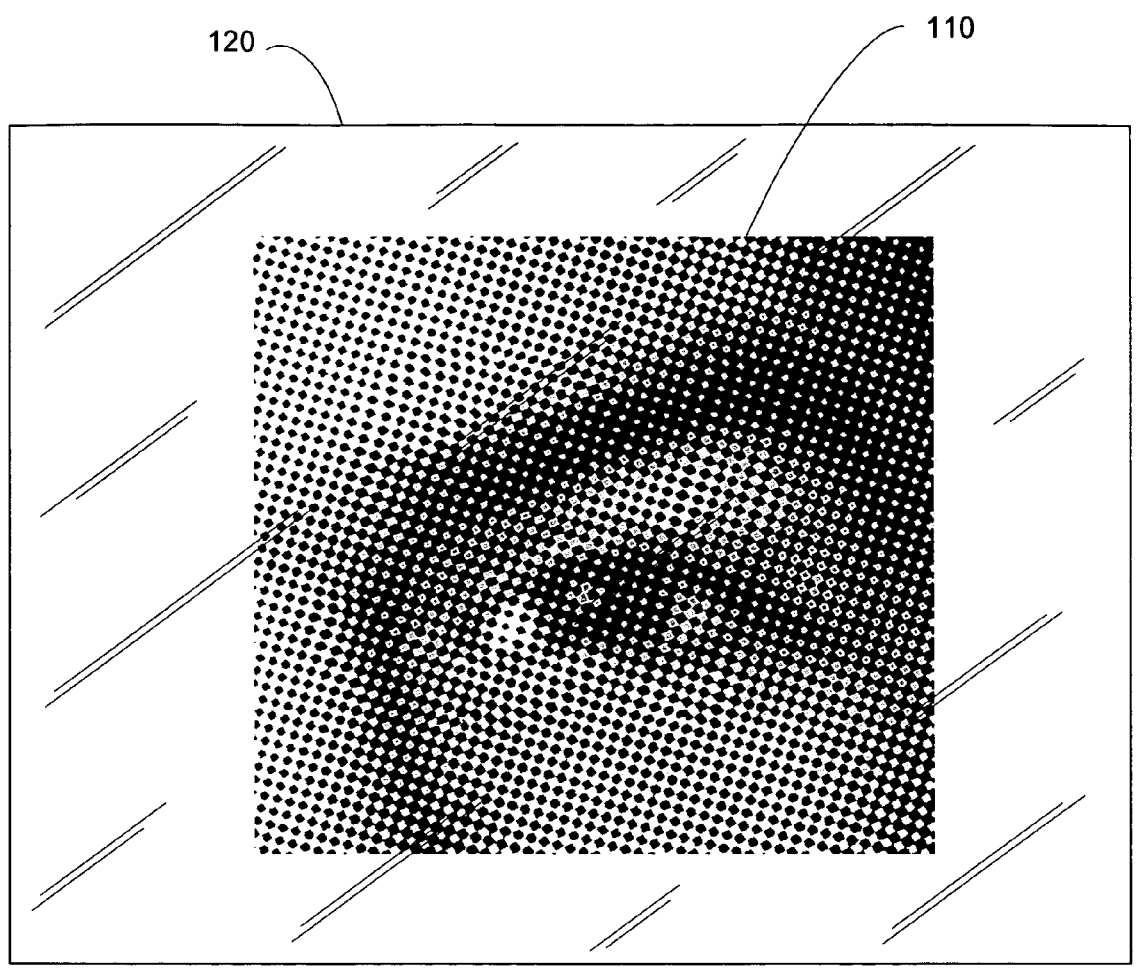
FIG. 2 is an illustration of a transmittent sheet having a primary image and an embedded encoded image printed thereon.
Figure 3:
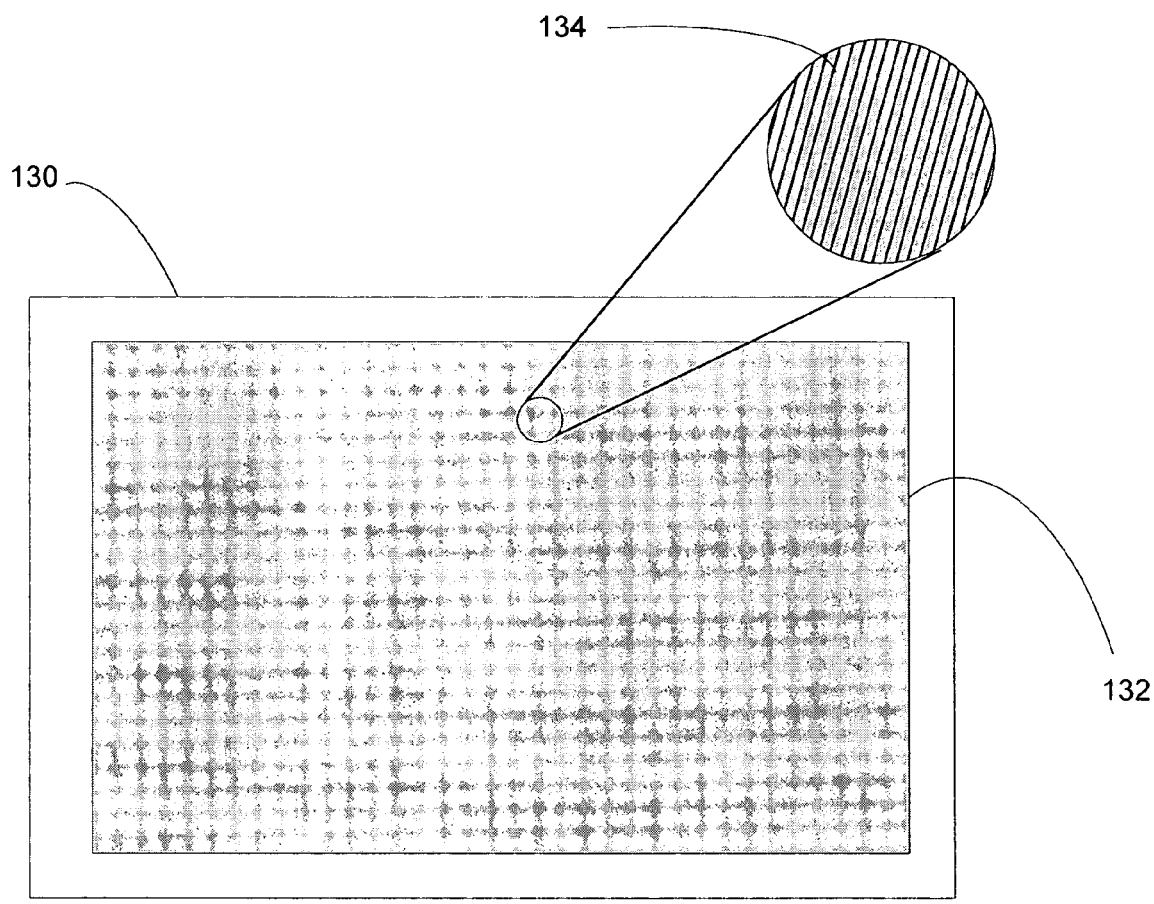
FIG. 3 is an illustration of an embossed reflective decoder according to an embodiment of the invention.
Figure 4:
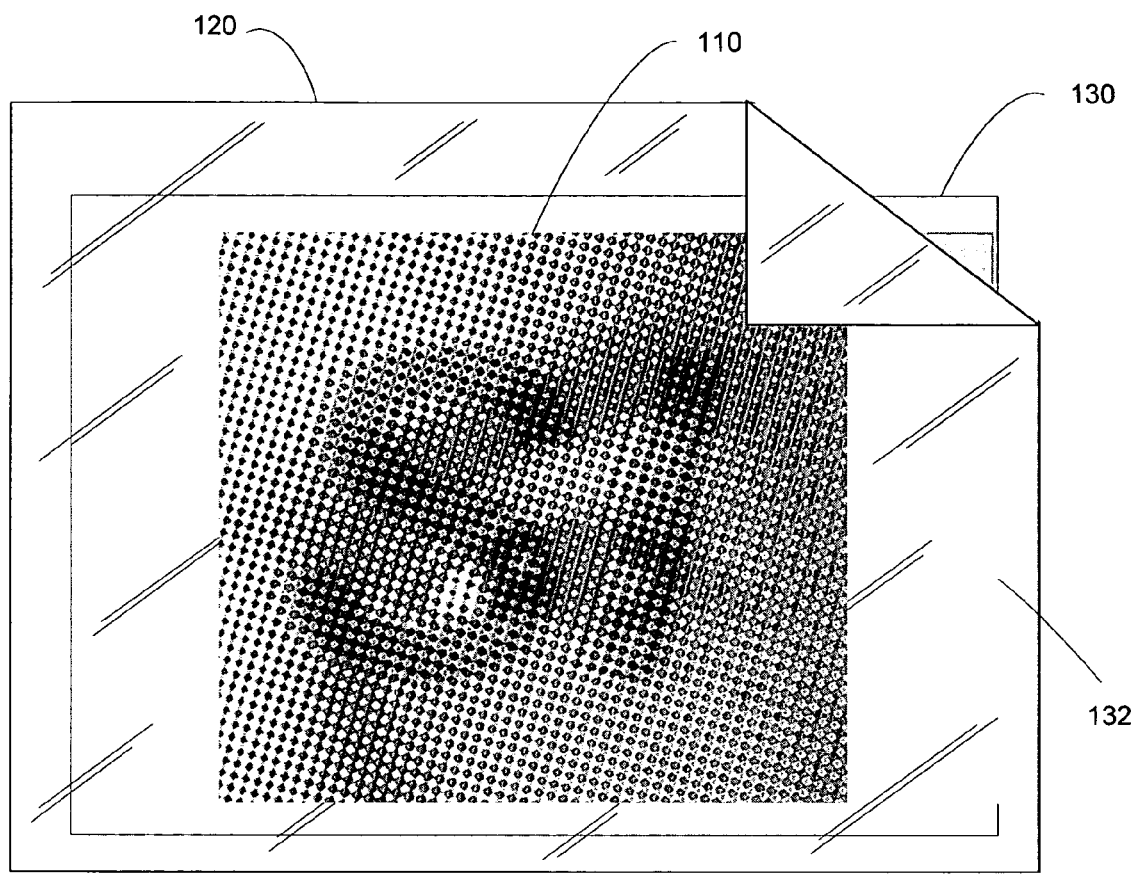
FIG. 4 is an illustration of the use of an embossed reflective decoder to decode an encoded image printed on a transmittent sheet.

FIGS. 2-4 illustrate an exemplary embodiment of the invention. In this embodiment, instead of applying the encoded image (and any background or primary image) to an opaque substrate, an encoded image 110 is applied to a light transmittent sheet 120. The sheet 120 may be any transparent or translucent material on which the encoded image may be applied. In some embodiments, the sheet may be formed as a relatively thin planar member from a light transmittent polymeric material such as acetate, polypropylene, polycarbonate or cellophane. The planar sheet may be formed so as to be rigid or flexible.

The encoded image 110 may be produced using any of the previously described analog or digital encoding methods. In the example image of FIG. 2, an encoded image of the letters "SI" has been embedded within a primary image of a portion of a person's face. The image 110 may be applied to the light transmittent sheet using any print medium and any process having sufficient resolution to print the encoded deviations to the regularized background or primary image at a desired encoding frequency.

With reference to FIGS. 3 and 4, the encoded image 110 applied to the light transmittent sheet 120 may be decoded using a reflective decoder 130 having a reflective decoding area 132. The reflective decoding area 132 has a surface topography in which a repetitive pattern 134 has been formed. This pattern has one or more characteristics that correspond to the encoding parameters and methodology used to encode the image 110. For images encoded through the shifting of linear halftone segments (i.e., rasters), the pattern 134 may comprise a series of linear ridges or valleys as shown schematically in the magnified portion of FIG. 3. The alternating ridges and valleys or adjacent linear valleys may be shaped to provide a focusing effect on the light they reflect. In this case, the pattern 134 is formed with a line frequency corresponding to the raster frequency used to encode the image 110. Another characteristic of the pattern that could correspond to an encoding parameter is the angular orientation of the linear ridges or valleys.

The surface topography of the reflective decoding area 132 may be established in a variety of ways, including mechanical embossing or debossing and material removal using an etching or laser removal process. Any process capable of producing sufficiently fine surface variations may be used.

As shown in FIG. 4, the encoded image 110 may be decoded by placing the transmittent sheet 120 over the reflective decoding area 132 of the reflective decoder 130 so that the raster lines of the primary image are approximately parallel to the ridges or valleys of the reflective decoder 130. It can be seen that light passing through the transmittent sheet 120 is reflected back from the reflective surface area 132. Because the topography of the reflective surface area 132 has characteristics corresponding to the encoding parameters of the encoded image 110, the embedded "SI" image is revealed.

Figure 5:
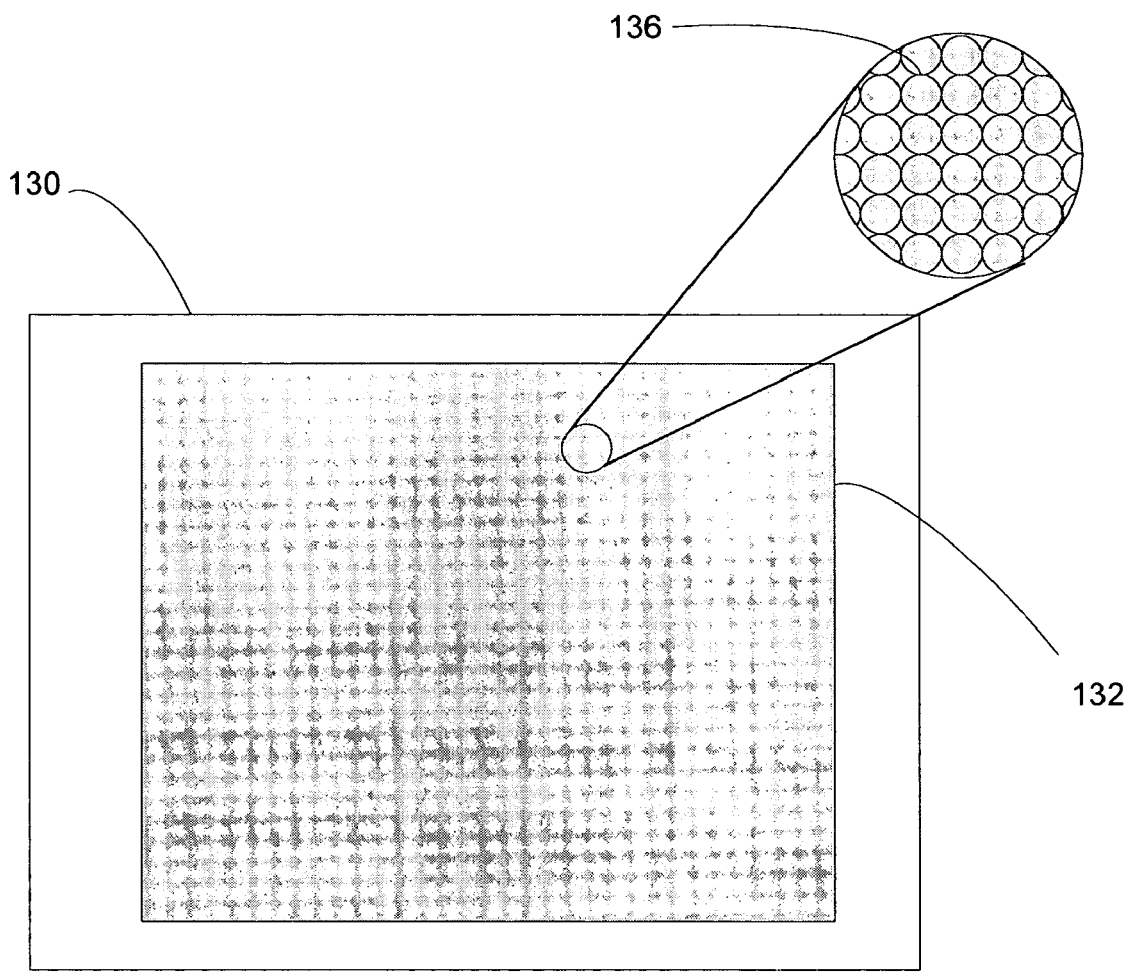
FIG. 5 is an illustration of an embossed reflective decoder according to an embodiment of the invention.

It will be understood that the elements of the encoded image 110 and the reflective surface topography are not limited to linear elements. For example, some encoded images comprise discrete non-linear elements that would ordinarily be decoded using a refractive micro-array lens. For such images, a surface pattern 136 comprising a matrix of regularly spaced and shaped depressions may be used, as shown schematically in FIG. 5. The frequency and orientation of the array elements are established so as to correspond to the encoding parameters of the encoded image.

Figure 6:
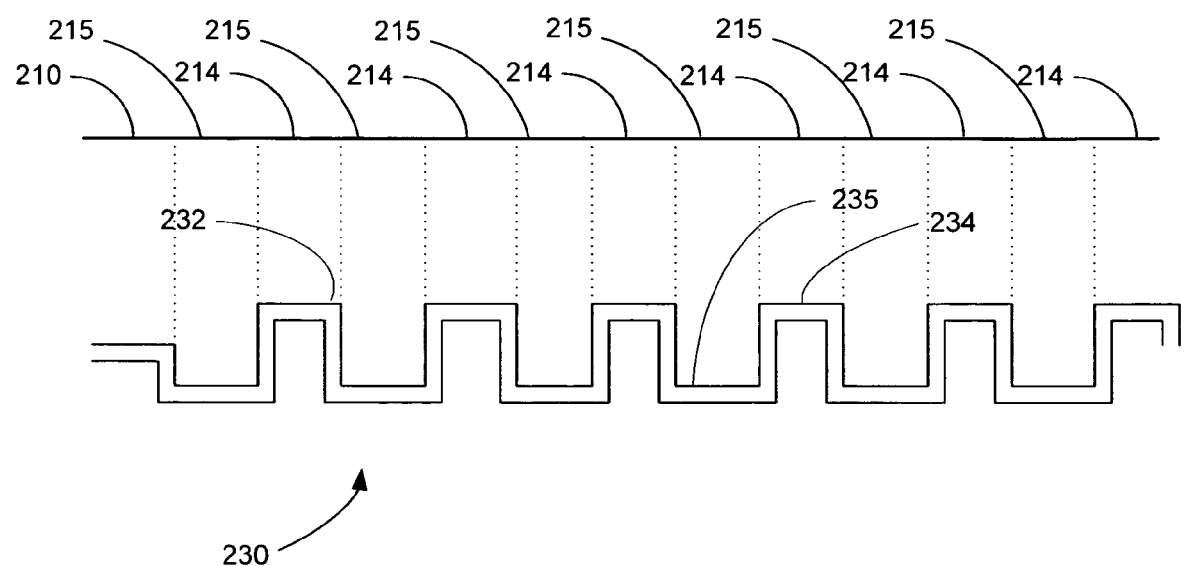
FIG. 6 is an edgewise view of an embossed reflective decoder according to an embodiment of the invention.

Usable configurations for the reflective surface topography will now be discussed in more detail. FIG. 6 depicts the cross-section of a linearly structured decoder 230 according to an embodiment of the invention. In this embodiment, the surface 232 is constructed so as to provide alternating ridges 234 and valleys 235, each having a flat reflective surface. When light passes through the image on a light transmittent sheet 210 and is reflected off the surface 232, the portions 215 of the image reflected from the flat surface of the valleys 235 will appear to be at a different distance from the viewer than will the portions 214 of the image reflected from the flat surface of the ridges 234. This occurs for the simple reason that these surfaces are, in fact, at different distances from the sheet 210.

It has been found that if the ridges 234 are spaced at the frequency of a linearly encoded image, the decoder 230 allows the encoded image to be viewed. This occurs because, with the decoder properly positioned, the deviations from the regularly spaced lines will appear to be at a different depth from the lines themselves. It will be recognized, however, that because the reflecting surfaces are flat, there is no magnification of the decoded image elements.

Figure 7:
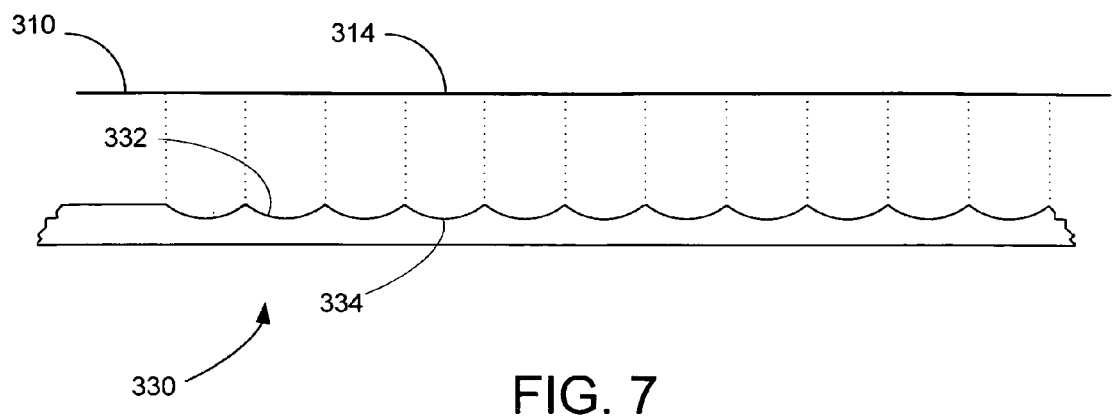
FIG. 7 is an edgewise view of an embossed reflective decoder according to an embodiment of the invention.
Figure 8:
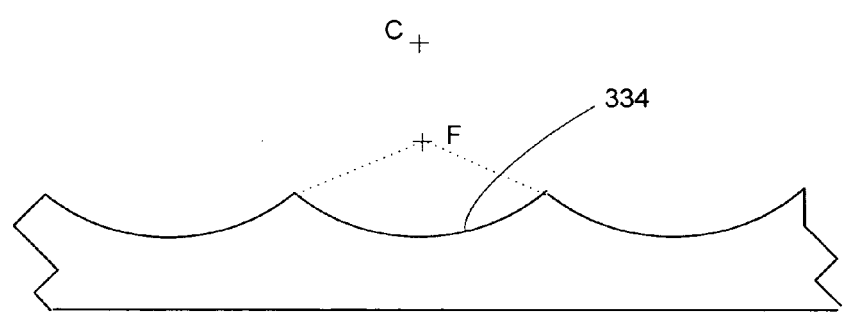
FIG. 8 is an edgewise view of a portion of the embossed reflective decoder of FIG. 7.

With reference now to FIGS. 7 and 8, a magnifying linear embossed decoder 330 may be formed by forming the reflective surface 332 to form regular periodic linear valleys 334. The surface of these valleys may be formed with a circular or parabolic arc having a center of curvature C and a focal point F. When an image portion 314 on a light transmittent sheet 310 is reflected in the surface of valley 334 it produces a reflected image portion, the nature of which is dependent on the distance of the sheet 310 from the embossed surface 332. If the sheet 310 is positioned between the center of curvature and the focal point of the curved valley surface 334, the reflected image is real, inverted and magnified. If the sheet 310 is positioned between F and the reflective surface 332, the reflected image portion is virtual and magnified. In either case, the result is similar to the effect of a lenticular lens. When reflected off the reflective surface 332, an image printed on the transmittent sheet is effectively sampled at the frequency (i.e., number of valleys 334 per inch) of the embossed decoder 330. When the frequency matches the encoding frequency of an encoded image embedded or printed on the transmittent sheet, the reflected image effectively decodes the encoded image for viewing.

Figure 9:
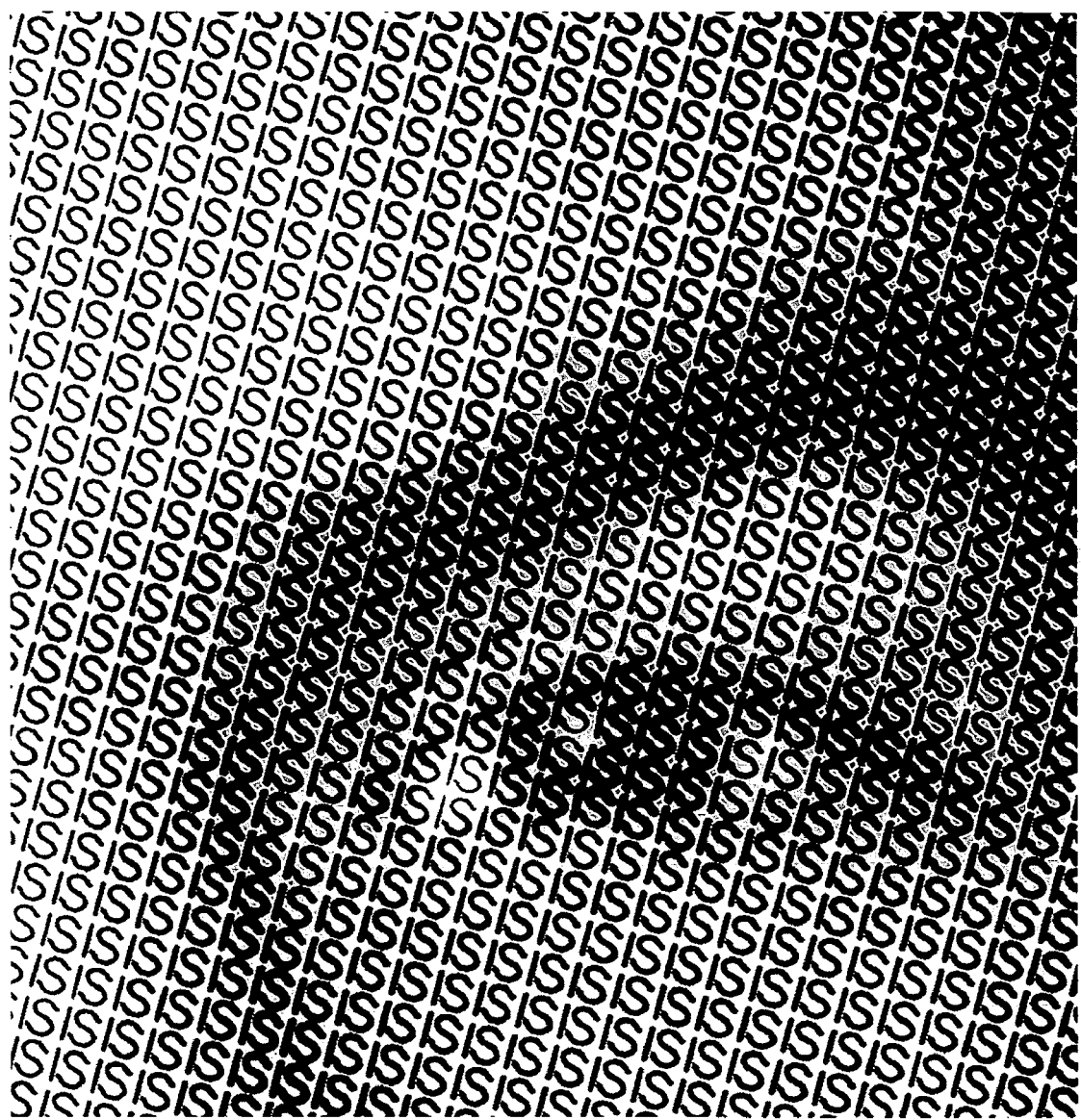
FIG. 9 is an enlarged portion of an image formed from the microtext indicia "SI.
Figure 10:
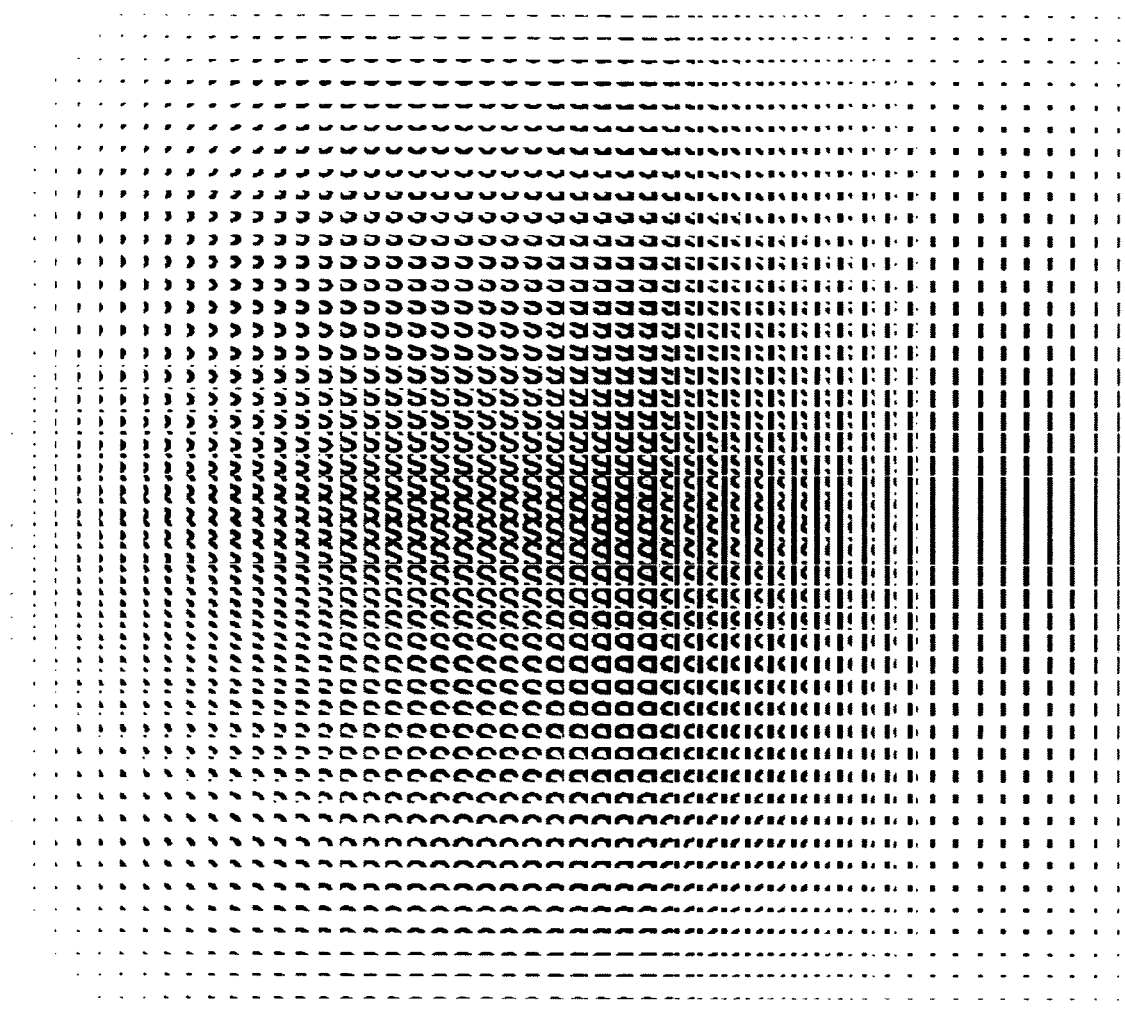
" and FIG. 10 is an encoded image formed by compressing an array of microtext in two directions.

In some instances, it may be desirable to use micro-text half-toning to produce images for printing on the light transmittent sheet. As is well known in the art, micro-text is generally not viewable by the naked eye but may be revealed through the use of a refractive micro-array lens with a frequency corresponding to that with which the image was printed. The micro-text may be formed using any user-defined indicia. This may be text or drawn shapes such as flags, logos, stars or other geometric figures. An example of an image half-toned using the microtext "SI" is shown in FIG. 9. A micro-array lens placed over such an image acts as a Moiré magnifier and produces an enlargement of the micro-text so that it can be viewed and/or read. A micro-array lens may also be used to decode certain two dimensional encoded images. Such images may be produced using methods similar to the one-dimensional encoding methods disclosed in U.S. Pat. No. 5,708,717. For example, in some embodiments of the '717 patent, an image is sliced and compressed to produce a scrambled image. A lenticular lens is then used to magnify the compressed slices, and thus decode the image. A similar two dimensional scrambled image can be produced by compressing in two directions instead of one (i.e., along the line). The output is a scrambled image formed of compressed circular areas or compressed squares. An example image if this type is shown in FIG. 10. When a micro-array lens is placed on top of the encoded image, each lens magnifies ("decompresses") the areas of the image underneath it, thus producing a decoded image.

It has been found that the effect of a refractive micro-array lens can be produced through the use of a reflective lens/mirror formed from an array of discrete depressions having a regular spherical or parabolic surface curvature. Each depression acts as a reflective lens with a center of curvature and a focal point. A cross-section along the center line of a row of such depressions would appear identical to the cross-section of FIGS. 7 and 8. As with the linear reflective elements of the reflective decoder 330 of FIG. 7, the discrete lens element produces a magnified reflective image of a portion of the image printed on the transmittent sheet 310 if the transmittent sheet 310 is positioned between the center of curvature and the reflective surface. If the frequencies of the array match the encoding frequencies of the two dimensional encoded image embedded or printed on the transmittent sheet 310, the reflected image effectively decodes the encoded image for viewing.

The encoding and decoding elements used in the above-described micro-array embodiments need not be confined to circular or square plan-form shapes. Other polygonal shapes (for example, hexagonal or octagonal) may also be used.

Although the reflective decoder embodiments discussed above all have concave reflective elements, it will be understood that decoders may also be produced using convex lens elements.

The reflective decoders of the invention may be produced using any substrate in which the reflective lens elements may be formed. Typical materials may include but are not limited to paper, cardboard and metal foil. The topographical features of the reflective surface elements may be formed using any suitable method including embossing, debossing, surface material removal, and surface material deposition.

The reflectivity of the reflective surface may be established in any suitable manner before or after the surface geometry is established. In some embodiments, an unformed substrate (e.g., cardboard) may be coated with a reflective material such as a high gloss enamel prior to embossing to produce a reflective lens surface. Alternatively, a thin reflective coating may be applied after the surface topography has been established, although care would be required to assure that the correct final surface geometry is established and maintained. In other embodiments, the substrate may have an inherently reflective material.

In a variation on the use of an embossed surface to decode an encoded image, the encoded image may be printed on a flat surface of an opaque substrate. The substrate may then be embossed or debossed using a pattern similar to those described above for linear and micro-array reflective decoder surfaces. The embossed/debossed pattern is formed using an element frequency that corresponds to the frequency with which the primary or background image and encoded image were printed on the substrate. The topographical pattern is oriented to correspond to the orientation of the printed elements. The resulting effect is similar to the effect observed when a transmittent sheet with an encoded image is placed over the square wave embossed decoder 230 of FIG. 6. The portions of the image that have been depressed (or raised) relative to the other portions of the image will be slightly farther from the viewer. The effect is to emphasize deviations from the regular spacing of the printed elements, which causes the encoded image to become visible. It will be understood that the decoder may be formed using other wave forms such as an asymmetrical (rectangular) wave can be used. The wave form also does not have to follow a linear pattern. Sine lines, triangular lines, or any other predefined pattern can be used when embossing a decoder. The encoding process should, of course, follow the same pattern.

Certain effects can be achieved if different predetermined surface portions are embossed using different depths. In this way, corresponding portions of the decoded image may made to appear to be at different distances from the embossed surface. This may be used to create 3-D effects, animations, multiple phase images, or other artistic effects in the decoded image.

Other variations in encoding and decoding may be used in conjunction with the embossed decoders of the invention. For example, the frequency of an encoded image and, thus, the frequency of a corresponding reflective decoder may be made to vary in a systematic manner. Another variation would be to vary the depth or height of the topographical elements so as to achieve variable magnification at systematically established locations corresponding to those encoded into the image. In yet another variation, a circular embossing pattern may be used. In one example of such a pattern, the pattern could be formed from concentric circles each having a different magnification or frequency.

Reflective decoders according to the invention may be applied to or incorporated on any object for which authentication is desired. The authenticatable object may comprise the reflective decoder alone, in which case the object can be authenticated by placement of a light transmissive authentication sheet over the decoder. Authentication indicia would be printed or otherwise formed on the authentication sheet. The authentication indicia would include an latent image encoded using one or more encoding parameters corresponding to topographical features of the reflective decoder. When the authentication sheet is placed over the reflective decoder in the proper orientation, the latent image is revealed. It will be understood that reflective decoders having the proper decoding characteristics will only be found on authentic objects and that placement of the authentication sheet over a reflective surface will reveal the latent image only if the reflective surface has the proper decoding characteristics. Thus, application of the reflective decoder serves as a sufficient mechanism for authentication.

In another aspect of the invention, the authenticatable object may be made self-authenticating by attaching the authentication sheet to the authenticatable article in such a way that it can be selectively placed over the reflective decoder to authenticate the authenticatable object. Alternatively, the authentication sheet may be permanently affixed over the reflective decoder so that the latent image is always immediately discernible.

Another form of self-authenticating object makes use of the previously described embodiment in which the encoded image is printed directly on the reflective decoder surface. In this embodiment too, the latent image is always discernible.

It will be understood that the authenticatable object may be an article that is, itself, of value and that is subject to theft, unauthorized sale or counterfeiting. In many instances, however, the authenticatable object may be a tag or label that is attached to an article of value.

It will be understood that the decoders of the invention may be used to decode a wide variety of encoded images. In addition to decoding latent encoded images, they may also be used to decode "void" patterns.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

What is claimed is:

1. A reflective decoding device for use in decoding an encoded image comprising a latent image encoded using at least one encoding parameter, the device comprising:
a substrate with a reflective surface portion having a surface topography comprising a predetermined pattern of topographical features, the predetermined pattern being configured with at least one geometric characteristic corresponding to the at least one encoding parameter so that placement of a light-transmissive sheet having the encoded image formed thereon over the predetermined pattern of topographical features allows the latent image to be viewed from any angle,
wherein the predetermined pattern of topographical features comprises an array of regularly spaced discrete variations in surface geometry comprising at least one of the set consisting of discrete recesses and discrete protrusions relative to a nominal surface level, the array having a predetermined spacing frequency in at least one dimension along the reflective surface.

2. A reflective decoding device according to claim 1 wherein the predetermined pattern of topographical features comprises a plurality of regular linear variations spaced apart at a predetermined line frequency.

3. A reflective decoding device according to claim 2 wherein the linear variations comprise at least one of the set consisting of linear grooves and linear ridges.

4. A reflective decoding device according to claim 3 wherein each of the linear grooves and linear ridges has an arcuate cross-section.

5. A reflective decoding device according to claim 1 wherein the discrete variations in surface geometry are formed with a predetermined geometric plan-form shape.

6. A reflective decoding device according to claim 1 wherein the predetermined pattern of topographical features is formed by at least one of the set consisting of embossing and debossing.

7. A reflective decoding device according to claim 1 wherein the predetermined pattern of topographical features is formed by removal of material from the reflective surface.

8. A reflective decoding device according to claim 1 further comprising:
authentication indicia formed on the reflective surface, the authentication indicia comprising the encoded image positioned in a decoding orientation relative to the predetermined pattern.

9. An authenticatable object comprising:
a reflective decoder having a reflective surface having a surface topography comprising a predetermined pattern of topographical features, the predetermined pattern being configured with at least one geometric characteristic corresponding to an encoding parameter of an encoded image so that the reflective decoder surface may be used to view the encoded image from any angle when the encoded image is placed in registration therewith,
wherein the predetermined pattern of topographical features comprises an array of regularly spaced discrete variations in surface geometry comprising at least one of the set consisting of discrete recesses and discrete protrusions relative to a nominal surface level, the array having a predetermined spacing frequency in at least one dimension along the reflective surface.

10. An authenticatable object according to claim 9 further comprising:
a light-transmissive authentication sheet having authentication indicia formed thereon, the authentication indicia comprising the encoded image, the light transmissive authentication sheet being configured for selective placement in a decoding orientation adjacent the reflective surface and in registration with the predetermined pattern so that incident light transmitted through the light transmissive authentication sheet is reflected off the reflective decoder surface and back through the light-transmissive authentication sheet.

11. An authenticatable object according to claim 9 further comprising:
a light-transmissive authentication sheet having authentication indicia formed thereon, the authentication indicia comprising the encoded image, the light transmissive authentication sheet being permanently disposed in a decoding orientation adjacent the reflective surface and in registration with the predetermined pattern so that incident light transmitted through the light transmissive authentication sheet is reflected off the reflective decoder surface and back through the light-transmissive authentication sheet.

12. An authenticatable object according to claim 9 further comprising:
  authentication indicia formed on the reflective surface, the authentication indicia comprising the encoded image positioned in a decoding orientation relative to the predetermined pattern.

13. An authenticatable object according to claim 9 wherein the predetermined pattern of topographical features comprises a plurality of regular linear variations spaced apart at a predetermined line frequency.

14. An authenticatable object according to claim 13 wherein the linear variations comprise at least one of the set consisting of linear grooves and linear ridges.

15. An authenticatable object according to claim 14 wherein each of the linear grooves and linear ridges has an arcuate cross-section.

16. An authenticatable object according to claim 9 wherein the linear variations are formed with a predetermined geometric plan-form shape.

17. An authenticatable object according to claim 9 wherein the predetermined pattern of topographical features is formed by at least one of the set consisting of embossing and debossing.

18. An authenticatable object according to claim 9 wherein the predetermined pattern of topographical features is formed by removal of material from the reflective surface.

19. A method of forming a reflective decoding device for use in decoding an encoded image comprising a latent image encoded using at least one encoding parameter, the method comprising:
  providing a substrate with a decoding surface portion; and
  forming the decoding surface portion into a reflective decoder surface having a surface topography comprising a predetermined pattern of topographical features, the predetermined pattern being configured with at least one geometric characteristic corresponding to the at least one encoding parameter so that placement of an authentication sheet having the encoded image formed thereon over the reflective decoder surface allows the latent image to be viewed from any angle,
  wherein the predetermined pattern of topographical features comprises an array of regularly spaced discrete variations in surface geometry comprising at least one of the set consisting of discrete recesses and discrete protrusions relative to a nominal surface level, the array having a predetermined spacing in at least one dimension along the reflective surface.

20. A method according to claim 19 wherein the action of forming comprises:
  embossing or debossing the decoding surface portion to form the predetermined pattern of topographical features.

21. A method according to claim 19 wherein the action of forming comprises:
  selectively removing material from the decoding surface portion to form the predetermined pattern of topographical features.

22. A method according to claim 19 wherein the action of forming comprises:
  applying a reflective coating to the decoding surface portion.

23. A method according to claim 19 wherein the predetermined pattern of topographical features comprises a plurality of regular linear variations spaced apart at a predetermined line frequency.

24. A method according to claim 23 wherein the linear variations comprise at least one of the set consisting of linear grooves and linear ridges.

25. A method according to claim 24 wherein each of the linear grooves and linear ridges has an arcuate cross-section.

26. A method according to claim 19 wherein the predetermined pattern of topographical features comprises a plurality of regular linear variations spaced apart so as to establish a systematically varying line frequency.

27. A method according to claim 19 wherein the discrete variations in surface geometry are formed with a predetermined geometric plan-form shape.

28. A method according to claim 19 wherein the predetermined pattern of topographical features comprises an array of discrete variations in surface geometry having a systematically varying spacing frequency in at least one dimension along the reflective surface.

* * * * *

UNITED STATES PATENT AND TRADEMARK OFFICE
CERTIFICATE OF CORRECTION

| | | |
|---|---|---|
| PATENT NO. | : 7,487,915 B2 | Page 1 of 1 |
| APPLICATION NO. | : 11/510223 | |
| DATED | : February 10, 2009 | |
| INVENTOR(S) | : Alfred V. Alasia et al. | |

It is certified that error appears in the above-identified patent and that said Letters Patent is hereby corrected as shown below:

Col. 12 Claim 19, line 4, insert --frequency-- after the word spacing

Signed and Sealed this

Twenty-fourth Day of March, 2009

JOHN DOLL
*Acting Director of the United States Patent and Trademark Office*